United States Patent
Kannan (10) Patent No.: US 9,639,465 B2
(45) Date of Patent: May 2, 2017

(54) DYNAMIC CACHABLE MEMORY INTERFACE FREQUENCY SCALING

(71) Applicant: Qualcomm Innovation Center, Inc., San Diego, CA (US)

(72) Inventor: Saravana Krishnan Kannan, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 207 days.

(21) Appl. No.: 14/630,451

(22) Filed: Feb. 24, 2015

(65) Prior Publication Data

US 2015/0317252 A1    Nov. 5, 2015

Related U.S. Application Data

(60) Provisional application No. 61/986,278, filed on Apr. 30, 2014.

(51) Int. Cl.
*G06F 12/08* (2016.01)
*G06F 12/00* (2006.01)
*G06F 13/00* (2006.01)
*G06F 12/0844* (2016.01)

(52) U.S. Cl.
CPC .......... *G06F 12/08* (2013.01); *G06F 12/0844* (2013.01); *G06F 2212/1016* (2013.01); *G06F 2212/1041* (2013.01); *G06F 2212/281* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 2005/0015553 A1* | 1/2005 | Park | .................... | G06F 12/0882 711/118 |
| 2005/0132238 A1* | 6/2005 | Nanja | .................... | G06F 1/3203 713/300 |
| 2006/0253715 A1* | 11/2006 | Ghiasi | .................... | G06F 1/3203 713/300 |
| 2008/0098254 A1* | 4/2008 | Altevogt | ............... | G06F 1/3203 713/600 |
| 2010/0293325 A1* | 11/2010 | Maheshwari | ....... | G06F 13/4243 711/105 |
| 2011/0264938 A1* | 10/2011 | Henroid | ................ | G06F 1/3203 713/323 |
| 2012/0131278 A1* | 5/2012 | Chang | ................. | G06F 12/0893 711/118 |

* cited by examiner

*Primary Examiner* — Jared Rutz
*Assistant Examiner* — Marwan Ayash
(74) *Attorney, Agent, or Firm* — Neugeboren O'Dowd PC (57) ABSTRACT

A method and apparatus for controlling a frequency of CMI are disclosed. The method may include classifying request types into one or more request groups, wherein each of the request types is a type of CMI request. A number of clock cycles that is sufficient to process a request in each request group may be assigned, and requests that are made to CMI may be monitored with one or more performance counters. A number of requests that occur during a length of time in each request group may be determined, and a frequency of the CMI may be periodically adjusted based upon the number of requests occurring per second in each request group and the assigned number of clock cycles per request for each request group.

12 Claims, 4 Drawing Sheets

DYNAMIC CACHABLE MEMORY INTERFACE FREQUENCY SCALING

CLAIM OF PRIORITY UNDER 35 U.S.C. §119

The present application for patent claims priority to Provisional Application No. 61/986,278 entitled "DYNAMIC CACHE FREQUENCY SCALING" filed Apr. 30, 2014, and assigned to the assignee hereof and hereby expressly incorporated by reference herein.

BACKGROUND

I. Field of the Disclosure

The technology of the disclosure relates generally to data transfer between hardware devices and cache memory constructs, and more particularly to control of cacheable memory interface frequencies.

II. Background

Electronic devices, such as mobile phones, personal digital assistants (PDAs), and the like, are commonly manufactured using application specific integrated circuit (ASIC) designs. Developments in achieving high levels of silicon integration have allowed creation of complicated ASICs and field programmable gate array (FPGA) designs. These ASICs and FPGAs may be provided in a single chip to provide a system-on-a-chip (SOC). An SOC provides multiple functioning subsystems on a single semiconductor chip, such as for example, processors, multipliers, caches, and other electronic components. SOCs are particularly useful in portable electronic devices because of their integration of multiple subsystems that can provide multiple features and applications in a single chip. Further, SOCs may allow smaller portable electronic devices by use of a single chip that may otherwise have been provided using multiple chips.

In applications where reduced power consumption is desirable, a frequency of a cacheable memory interface (CMI), such as cache memory and cache coherency interconnects, may be lowered, but lowering the frequency lowers performance of the CMI. If lowering the CMI frequency increases latencies beyond latency requirements or conditions for the subsystems coupled to the CMI, the performance of the subsystem may degrade or fail entirely. Rather than risk degradation or failure, the CMI clock may be set to higher frequencies to reduce latency and provide performance margin, but providing higher frequencies consumes more power.

SUMMARY

According to an aspect, the invention may be characterized as a method for controlling a frequency of cacheable memory interfaces (CMIs). The method may include classifying request types into one or more request groups that are types of CMI requests. A number of clock cycles that is sufficient to process a request in each request group may be determined, and requests that are made to the CMI may be monitored with one or more performance counters. A number of requests that occur during a length of time in each request group may be determined, and a frequency of the CMI may be periodically adjusted based upon the number of requests occurring per second in each request group and the assigned number of clock cycles per request group.

According to another aspect, a computing device is disclosed that includes a hardware device, a CMI coupled to the hardware device, a CMI frequency controller configured to control a frequency of the CMI, and a CMI load monitor. The CMI load monitor may be configured classify request types into one or more request groups that are types of CMI requests. In addition, the CMI load monitor may be configured to assign a number of clock cycles that is sufficient to process a request in each request group, monitor requests that are made to CMI with one or more performance counters, and determine a number of requests that occur during a length of time in each request group. The CMI load monitor controls the cache frequency controller to periodically adjust a frequency of the CMI based upon the number of requests occurring per second in each request group and the assigned number of clock cycles per request group.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Figure 1:
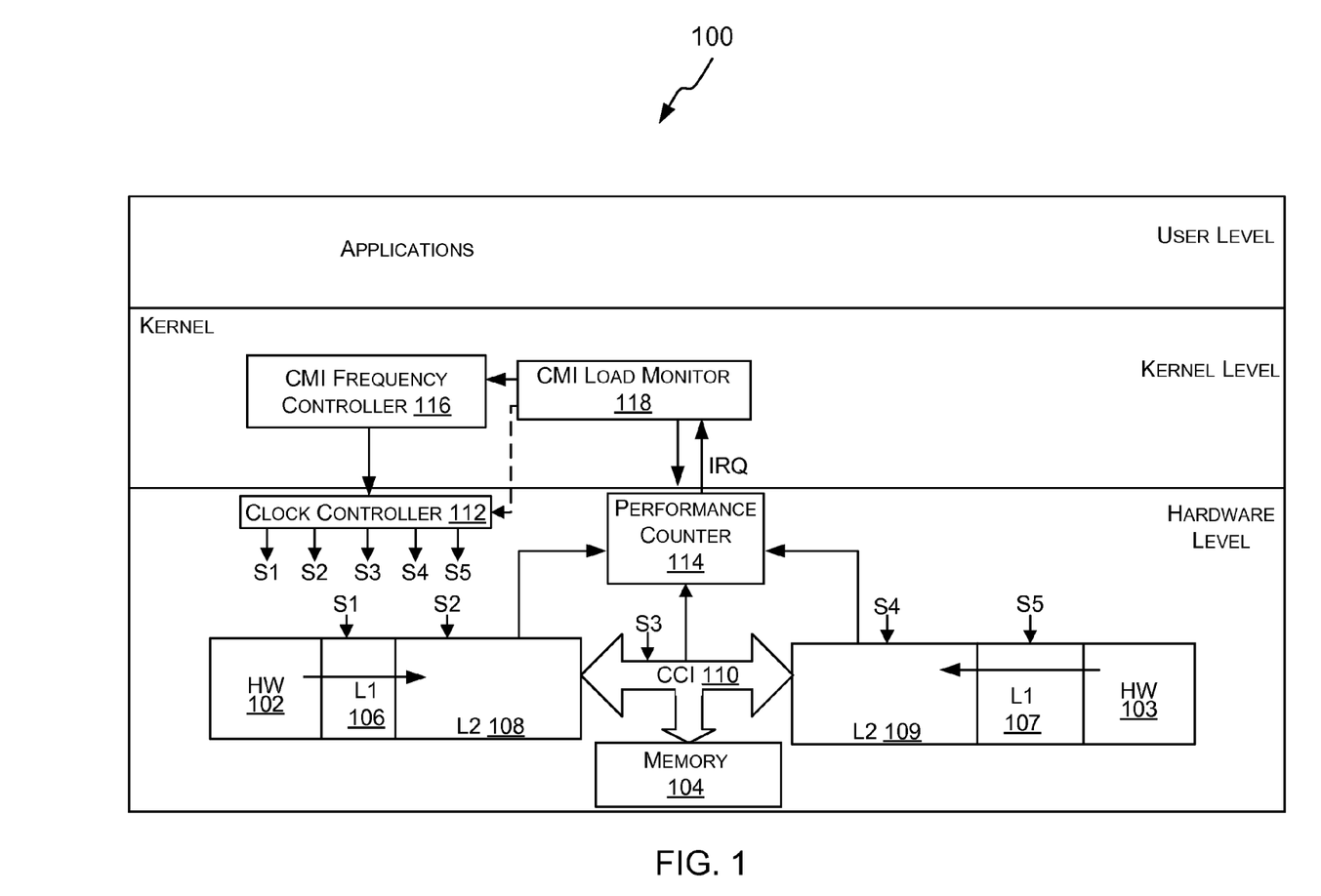
FIG. 1 is a block diagram that generally depicts functional components of an embodiment of a computing device.

Referring to FIG. 1, shown is a computing device 100 depicted in terms of abstraction layers from hardware to a user level. The computing device 100 may be implemented as any of a variety of different types of devices including smart phones, tablets, netbooks, set top boxes, entertainment units, navigation devices, and personal digital assistants, etc. As depicted, applications at the user level operate above the kernel level, which is disposed between the user level and the hardware level. In general, the applications at the user level enable a user of the computing device 100 to interact with the computing device 100 in a user-friendly manner, and the kernel level provides a platform for the applications to interact with the hardware level.

As depicted, in the hardware level a first hardware device (HW) 102 is in communication with system memory 104 (e.g., DDR memory) via a first level cache memory (L1) 106, a second level cache memory (L2) 108, and a cache coherency interconnect (CCI) 110. In addition, a second hardware device 103 is in communication with the system memory 104 via another first level cache memory 107, another second level cache memory 109, and the CCI 110. The L2 cache memories 108 and 109 may also snoop into each other through the CCI 110. As depicted, a clock controller 112 is coupled to the first level cache memories (L1) 106, 107; the second level cache memories (L2) 108, 109; and the CCI 110 via signals S1-S5. As shown, the second level cache memories 108, 109 and the CCI 110 are coupled to a performance counter 114. The first level cache memories (L1) 106, 107; the second level cache memories (L2) 108, 109; and the CCI 110 are generally referred to herein as cacheable memory interfaces (CMIs).

At the kernel level, a CMI load monitor 118 is in communication with the performance counter 114 and a CMI frequency controller 116 that is in communication with a clock controller 112. The hardware devices 102, 103, for example, may each be realized by a central processing unit (CPU), a graphics processing unit (GPU), a video encoder/decoder, and a variety of other hardware devices that are capable of accessing memory. Moreover, each hardware device 102, 103 may be realized by a cluster of processors, and each of the clusters may share a corresponding one of the L2 cache memories 108, 109.

In the depicted embodiment, the CMI frequency controller 116 may be realized by components implemented in the kernel (e.g., LINUX kernel), and the CMI load monitor 118 may be realized by additions to the LINUX kernel to effectuate the functions described herein. As depicted, the CMI load monitor 118 is in communication with the performance counter 114 to enable the CMI load monitor 118 to configure the performance counter 114 and to enable the CMI load monitor 118 to receive interrupts from the performance counter 114. In turn, the CMI load monitor 118 communicates with the CMI frequency controller 116 to communicate desired performance attributes for the first level cache memories (L1) 106, 107 and the second level cache memories (L2) 108, 109. And in turn, the CMI frequency controller 116 controls the clock controller 112 (as described further herein) to effectuate the CMI frequency.

It should be recognized that the depiction of components in FIG. 1 is a logical depiction and is not intended to depict discrete software or hardware components, and in addition, the depicted components in some instances may be separated or combined. For example, the CMI load monitor 118 may be adapted to provide the functionality provided by the CMI frequency controller 116 so the CMI load monitor 118 communicates directly (as depicted by a dotted line) with the clock controller 112; thus obviating the need for a separate CMI frequency controller.

In general, the CMI frequency controller 116 operates in connection with the performance counter 114, the CMI load monitor 118, and the clock controller 112 to scale the CMI frequency in accordance with the load on the CMI so that power consumption is reduced (e.g., as low as possible) without drastically reducing the performance of the hardware (HW) devices 102, 103 that are using the CMIs.

In this embodiment, the performance counter 114 provides an indication of the requests that are coming in to the CMIs (e.g., the L2 cache memories 108, 109 and the CCI 110). One of ordinary skill in the art will appreciate that most L2 cache memories 108, 109 and CCIs 110 include performance counters, and the depicted performance counter 114 (also referred to herein as a counter) generally represents one or more performance counters that may be distributed among the CMIs, and are specifically configured (as discussed further herein) to count the requests that are made to the CMIs (e.g., the L2 cache memories 108, 109 and the CCI 110).

Figure 2:
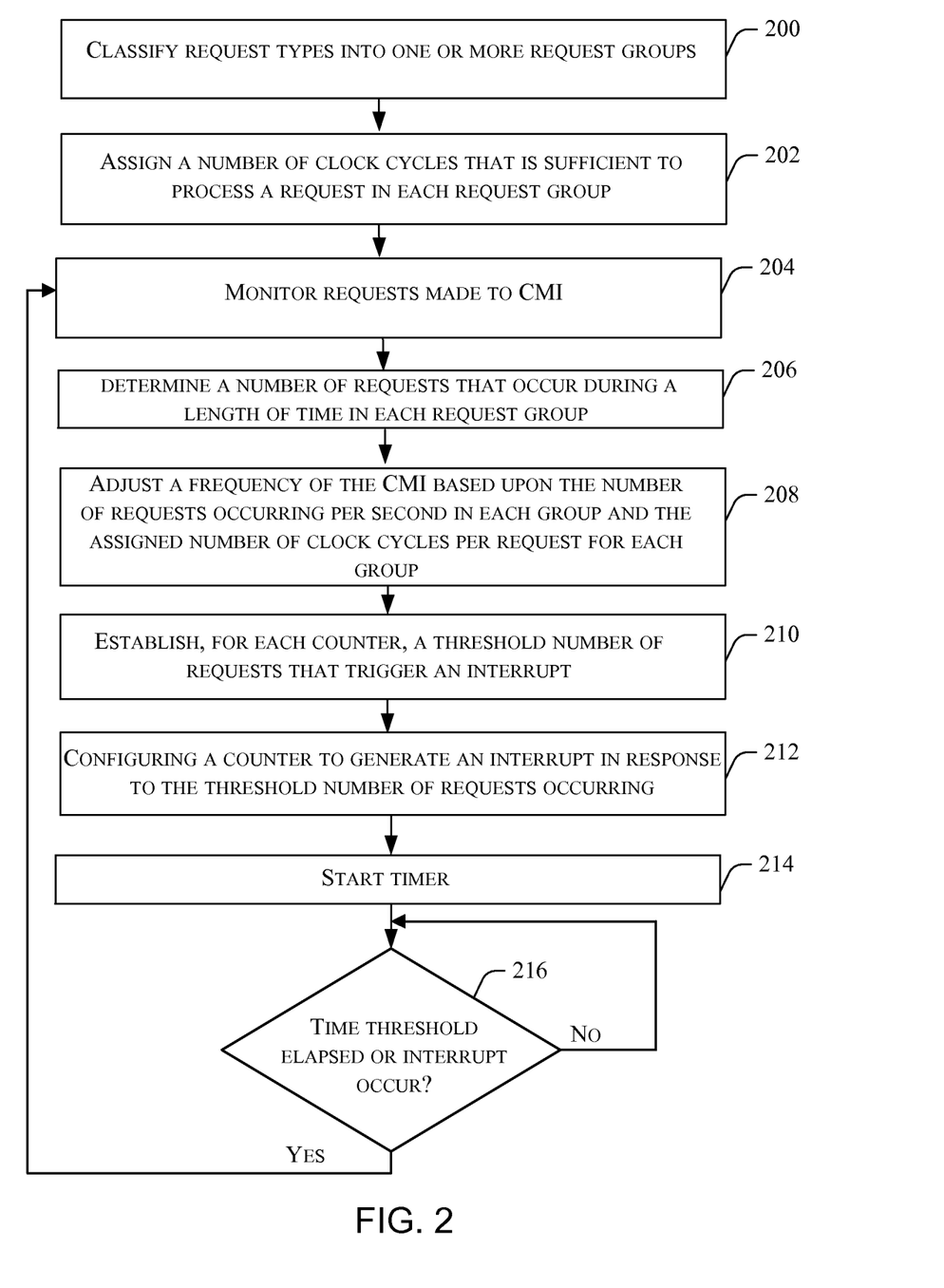
FIG. 2 is a flowchart depicting a method that may be traversed in connection with the embodiments disclosed herein.

While referring to FIG. 1, simultaneous reference is made to FIG. 2, which is a flowchart that depicts a method that may be traversed in connection with the embodiments described herein. As shown, request types may be classified into one or more groups (Block 200). In general, each of the request types is a type of CMI-request. In some embodiments for example, two or more performance counters (represented by performance counter 114) are available to count different types of requests. The requests could be of various types, such as cache maintenance operations (invalidate, clean, etc.); barriers and cache register read/writes; instruction and data read/write requests that result in cache-hit; and instruction and data read/write requests that result in cache-miss, snoops into other caches, etc. Having more than one counter available enables the different types of requests to be counted separately so that the CMI frequency may be adjusted to a frequency that is actually needed to process the various types of requests.

The advantage of having more than one counter available may be better appreciated in view of the following example. The real world time taken to process a cache-miss is significantly larger than the time taken to process a cache-hit. A significant portion of the time taken to process a cache-miss is spent stalling/waiting for memory to respond to a read/write request and a smaller portion of the time is spent in figuring out the request is a cache-miss, allocating a cache line, responding to the CPU, etc. In contrast, the entire time spent to process a cache-hit involves no waiting/stalling on any external entity and the entire work is done within the cache.

Assuming the cache is running at 1 MHz where each clock cycle is 1 microsecond, and the cache takes 5 microseconds to process a cache-hit and 30 microseconds to process a cache-miss. Therefore, when processing a cache-hit, the cache will spend all 5 clock cycles to process a cache-hit. Whereas when processing a cache-miss, the cache spends 10 cycles to process and respond to the CPU, and then another 20 cycles stalling/waiting on memory to respond. So, 20 out of 30 cycles that occur while a cache is processing a cache-miss are effectively wasted. The cache would have been able to process the cache-miss request in the same amount of time even if it was given only about 15 clock cycles (10 might not be quite enough cycles to process the request). So, for this cache, the non-stalled cycles per cache-hit request would be 5 cycles and the non-stalled cycles per cache-miss would be 10 cycles. Thus, having more than one counter available enables the CMI frequency to be adjusted in relation to the number of non-stalled cycles associated with the processing of each type of request.

To keep the CMI frequency calculation simple, and the number of required hardware monitor counters small, the requests may be split into three groups: heavy, medium and small depending on the number of non-stalled cycles required to process the request. For example, a cache miss may be classified as a heavy-type request; a cache hit may be classified as a medium-type request; and a cache register access may be classified as a small-type request.

As shown in FIG. 2, a number of clock cycles that that is sufficient to process a request in each request group may be assigned (Block 202). In many implementations, for a particular request group, an average number of clock cycles per request is assigned because, despite the fact that the number of cycles required to handle each request might vary for the requests within a group, on average, the number of cycles required to process a request may not have a lot of variance within the group. The average clock cycles per request can be either derived by empirical profiling of the specific hardware that will be used to realize the computing device 100 or by estimating the average number of clock cycles per request (e.g., based on intimate knowledge of the hardware design of the computing device 100).

As depicted, requests that are coming into the CMI are monitored by the performance counter(s) (Block 204), and the number of requests (per request group) that occur during a length of time (e.g., 50 milliseconds) is determined (Block

206). In this way a number of requests per second occurring in each request group may be computed and utilized as an indicator of the load on the cacheable memory interface (CMI). In embodiments where performance counters 114 are available to distinguish between the different types of requests, the requests may be monitored separately and the requests may be associated with each request group to arrive at a number of requests occurring in each request group per second.

As shown, the frequency of the CMI may be adjusted based upon the number of requests occurring per second in each request group (determined at Block 206) and the assigned number of clock cycles per request in the respective request group (assigned at Block 202) (Block 208). In an implementation where heavy, medium, and small request groups are utilized, the frequency of the CMI may be calculated as: required_freq=heavy_rps*cycles_per_heavy_req+ medium_rps*cycles_per_med_req+ small_rps*cycles_per_small_req where required_freq is the required CMI frequency; heavy_rps is the number of requests within the heavy group per second; cycles_per_heavy_req is the number of clock cycles assigned to the requests in the heavy request group; medium_rps is the number of requests occurring within the medium group per second; cycles_per_med_req is the number of clock cycles assigned to the requests in medium request group; small_rps is the number of requests occurring within the small group per second; and cycles_per_small_req is the number of clock cycles assigned to the requests in the small request group.

In some variations, the value of the requests per second is rounded up to multiples of "RPS_steps" before using it to compute the usage exceeded limit and the cache frequency. This process of rounding up helps in reducing frequent interrupt and/or frequency changes due to small variations in the cache load.

In some implementations, a "guard band" may be added to the computed CMI frequency. Despite having a threshold IRQ, it still takes a non-trivial amount of time (in a relative sense) to notice an increase in the requests per second, set the new CMI frequency, and effectuate a change of the actual CMI frequency. This could cause negative performance impact. To account for additional requests that could be transferred while the CMI is at the lower frequency before the frequency is increased, a guard_band_mhz may be added to the computed frequency before picking the actual CMI frequency. For example, the adjusted CMI frequency may be calculated as: adjusted_cache_freq=required_freq+guard_band_mhz. An important distinction to make is that the guard band is not applied when computing the threshold for the IRQ since doing so would dramatically reduce the effectiveness of the guard band.

Dropping the CMI frequency and the estimate of the CMI load as soon as the requests per second (RPS) to the cache starts decreasing may lead to a lot of increases and decreases of the estimated CMI load, and hence, a lot of increases and decreases of the CMI frequency that is selected. These variations are due to the potentially bursty nature of the workload on the device that is using the cache.

To avoid frequent "ping-pongs" of CMI frequency, an effective CMI frequency may be calculated by doing a cumulative weighted average of the adjusted CMI frequency and the previous effective CMI frequency. However, to avoid any negative performance impacts, the history is completely ignored and the effective throughput is considered to be the same as adjusted throughput when the latter is greater than the former. When the adjusted CMI frequency is lower than the previous effective CMI frequency, a decay_rate tunable parameter may be used to compute the effective CMI frequency, where decay_rate is the percentage of the previous effective CMI frequency that's discarded.

In short, the effective CMI frequency may be computed as follows: When the adjusted CMI frequency is higher than previous effective CMI frequency, eff_cache_freq=adjusted_cache_freq. Otherwise, the eff_cache_freq=((100−decay_rate)*previous_eff_cache_freq+ decay_rate*adjusted_cache_freq)/100. The CMI frequency is set to eff_cache_freq each time the hardware monitor counters are sampled—irrespective of whether it's due to the threshold IRQ or due to the expiry of the sampling period (sample_ms).

Although periodic adjustments to the frequency of the CMI (at Block 208), may optimally align a frequency of the CMI to the CMI load under non-variable operation (e.g., when the CMI load is not changing quickly), to provide more optimal performance, it is desirable to more quickly detect and react to an increase in load on cache so that the cache frequency is increased appropriately. This quick reaction to an increase in demand is not possible by doing periodic sampling of the HW counters.

As a consequence, in some embodiments a threshold number of requests is established for each counter that triggers an interrupt (Block 210) so that the frequency may also be adjusted when an interrupt occurs. For example, the limits that trigger an interrupt may be dynamically tuned for each counter based on the historical data collected from all the previous sampling of each corresponding counter. For example, if a particular counter counted X events since the previous sample, then setting up the interrupt limit to X or a lower value for that particular counter would cause a high probability of the interrupt to be fired again before the next sampling time point. That would result in too many interrupts very close to the next sampling time point and effectively one interrupt per sampling period would occur even if the load on the cache didn't change significantly, which would be very inefficient.

As a consequence, the interrupt may be set up to fire after the count exceeds X+tolerance, where X is the number of events counted in the previous sampling window and tolerance is the absolute number of additional requests that need to happen before the interrupt is triggered. Alternatively, the interrupt may be set up to fire after the count exceeds X*(1+(tolerance/100)), where X is the number of events counted in the previous sampling window and tolerance is in terms of percentage of X. A tolerance of zero would, as a consequence, result in the interrupt set up to come as soon as X events happen in the future, but higher tolerance percentage would result in waiting for a few more events to be counted past X before the interrupt is triggered.

For example, a usage-count-exceeded interrupt (existing count exceeded interrupt and/or a repurposed overflow interrupt) may be configured to generate an interrupt in response to the threshold number of events occurring (Block 212). By way of further example, a counter may be configured so that an interrupt occurs when the request count for a sampling window exceeds the request count that was observed in the previous sample window. In this way, if the usage increases suddenly, the frequency of the CMI may be quickly adjusted without waiting for the sampling period to expire. When the interrupt arrives, the RPS can be calculated by dividing the number of requests that were counted since the last sample by the time elapsed between the last sample and when the interrupt arrives.

It should be recognized that not all hardware counters have a "count exceeded value" interrupt. In such cases, the overflow interrupt may be repurposed as a "count exceeded value" interrupt. This is done by setting the start value of the counter to "Max counter value" minus "number of counts after which interrupt is required."

As depicted in FIG. 2, a timer is started and utilized in connection with the periodic adjustments to cache frequency (Block 214), and if either a time threshold elapses or an interrupt occurs (Block 216), the frequency of the CMI is adjusted (Block 208).

Figure 3:
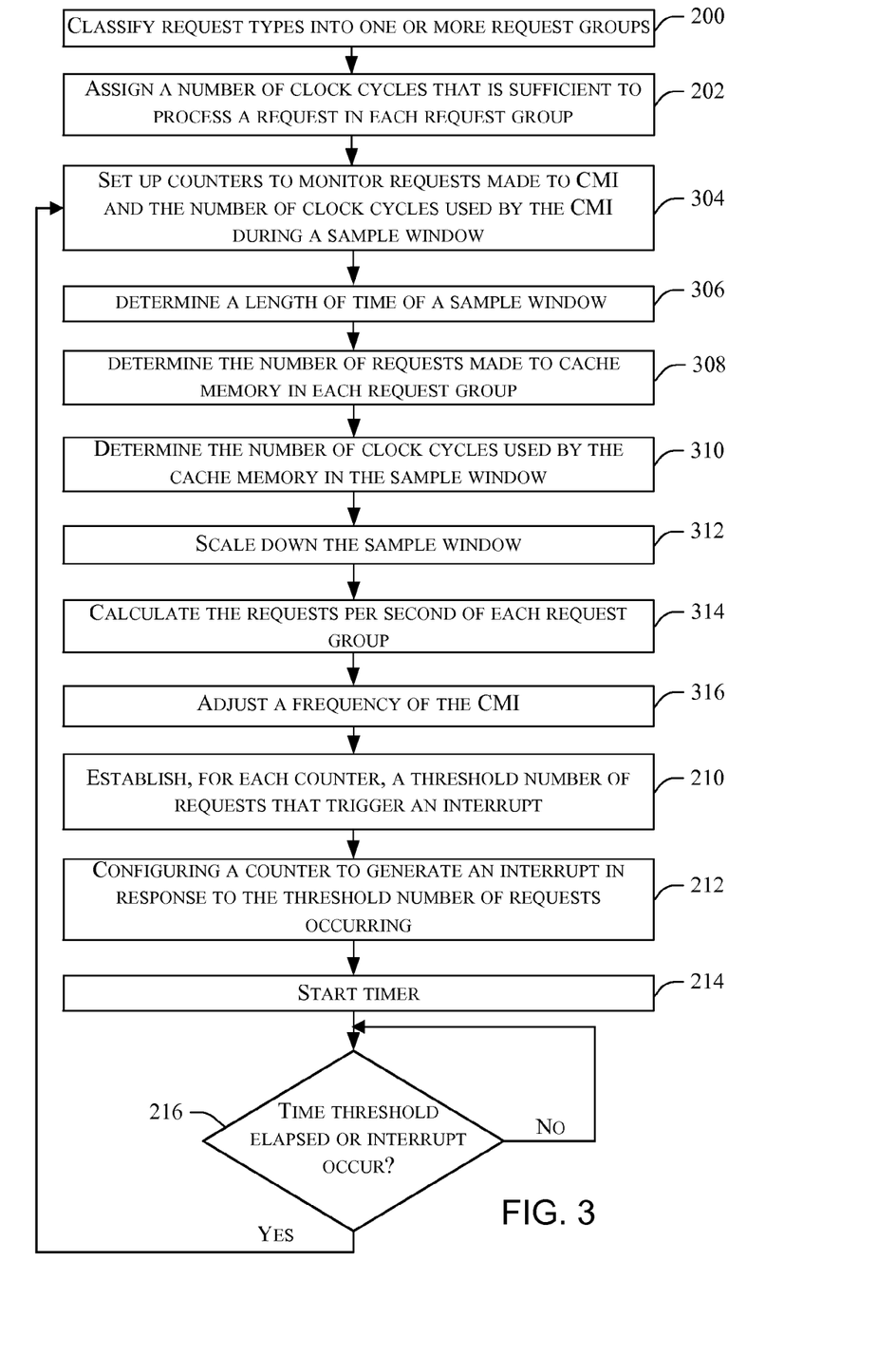
FIG. 3 is a flowchart depicting a method that may be traversed in connection with the embodiments disclosed herein.

Referring next to FIG. 3, it is a flowchart that depicts another method that may be traversed in connection with the embodiments described herein. The method depicted in FIG. 3 is similar to the method described with reference to FIG. 2 except that the method depicted in FIG. 3 takes into consideration a percent of time the CMI is actually utilized during a sample window to enable the cache frequency to be more appropriately adjusted to handle sporadic increases in a number of requests.

More specifically, if a sample window is 20 ms long, it is possible that there may be several requests that occur during a short portion of the sample window, e.g., during 5 ms of the sample window. If only the number of requests during the sample window are considered, then the cache frequency may be set too low to handle the increased intensity of requests during the 5 ms portion of the sample window. As a consequence, the method depicted in FIG. 3 assesses a percentage of time during the sample window that the cache is actively responding to requests. In this way, the cache frequency may be scaled up to accommodate sporadic increases in cache requests.

As shown, Blocks 200 and 202 depict the same steps described with reference to FIG. 2. Before describing the additional steps that are traversed in connection with the method depicted in FIG. 3, it is helpful to first understand that a sample window time period in this method is depicted as a time period that occurs from the steps depicted from Blocks 214 to Block 304, which is either determined by a length of time before an interrupt occurs at Block 216 or a time threshold (e.g., 20 ms) if an interrupt does not occur during the time threshold.

As depicted in FIG. 3, in this method counters are setup to monitor requests made to the CMI and also the number of clock cycles that are used by the CMI during the sample window (Block 304). In addition, the time-length of the sample window is determined (Block 306). As discussed above, the time-length of the sample window is determined to be the time that elapsed since the start of a timer at Block 214 and the occurrence of either an interrupt or the time threshold at Block 216.

In addition, the number of requests that were made (during the sample window) to the CMI in each request group is also determined (Block 308), and the number of clock cycles that are used by the CMI during the sample window is also determined (Block 310). To determine the number of clock cycles that are used at Block 310, a cycle counter (e.g., implemented by the performance counter 114) may be utilized.

As shown, the sample window is then scaled down based upon the percentage of time that the clock cycles are used during the sample window (Block 312). More specifically, the sample window may be scaled down by multiplying the sample window by a ratio of the number of clock cycles used by the CMI to the number of clock cycles provided to the CMI during the sample window.

In one or more embodiments, a maximum bound and a minimum bound are applied to this ratio. With respect to the minimum bound, it is applied to prevent the number of requests from being unwieldy. For example, even if the ratio would be scaled down to 1/100, it is undesirable to scale down the sampling window down by that much because the number of requests per second that would result would be a very high number even though the actual number of request might be very small.

Put another way, if the CMI (e.g., second level cache memory (L2) 108) is active for only 1% of the time, it is beneficial to ignore bursts of such a tiny duration because these bursts probably won't have much of an impact on performance even if they took five times longer. As a consequence, the sampling window may be scaled down as if the ratio was only 5/100. It should be recognized that these numbers are merely for purposes of example, and that in actual operation the particular scaling is tuned based on the device.

With respect to the maximum bound, if the ratio was determined to be 100/100 (i.e., no scaling), the maximum bound may limit the ratio to, for example, a maximum of 90/100. In this way, a frequency may be selected so that the second level cache memory (L2) 108 is kept busy for, at most, 90% of the time. A maximum bound on the ratio is beneficial because it enables more information to be obtained about the requests being made by the hardware device 102. More specifically, if the second level cache memory (L2) 108 were allowed to be busy 100% of time, then there would be uncertainty about whether the requests coming from the hardware device 102 to the second level cache memory (L2) 108 coincidentally kept the second level cache memory (L2) 108 busy 100% of the time or if the hardware device 102 would have sent many more requests, but was getting bottlenecked by the second level cache memory (L2) 108. By applying a maximum bound (e.g., that limits the second level cache memory (L2) 108 to being 90% busy), then it can be determined whether or not the second level cache memory (L2) 108 is causing a bottleneck.

The number of requests per second of each request group is then calculated by dividing the number of requests made to the CMI in each request group by the scaled-down sample window (Block 314). By using a scaled-down sample window to calculate the requests per second, the resultant number of requests per second that is calculated at Block 314 more accurately represents any spike in the number of requests that occur during a portion (e.g., 5 ms) of the sample window (e.g., 20 ms).

The frequency of the CMI is then adjusted to be a sum of products, wherein each product is the number of requests per second in each request group times the number of assigned clock cycles per request in each request group (Block 316). As shown, the following steps described with reference to Blocks 210 to 216 are the same steps carried out in the method depicted in FIG. 3.

As discussed above, the first hardware device 102 may be realized by a first cluster (cluster 1) of processors that share the first L2 cache memory 108, and the second hardware device 103 may be realized by a second cluster (cluster 2) of processors that share the second L2 cache memory 109. In these types of implementations, it is typical for the first L2 cache memory 108 to be fed the same clock signal being fed to the processors in cluster 1 that share the L2 cache memory 108 (e.g., the S2 signal in these implementations may be combined with S1 as a single signal). In these types of implementations, since the actual work is done in the processors and the L2 cache memory 108 plays an optimization role, it is also typical for the frequency of cluster 1 to be determined by the load on the processors in cluster 1. Similarly, the frequency of cluster 2 may be determined by the load on the processors in cluster 2 with the second L2 cache memory 109 being fed the same clock signals fed to the processors in cluster 2 (e.g., the S4 signal may be combined with S5 as a single signal).

As depicted in FIG. 1, the first L2 cache memory 108 is coupled to the second L2 cache memory 109 via the CCI 110; thus the second L2 cache 109 may snoop into the first L2 cache memory 108 using the CCI 110. In these instances, the first L2 cache 108 may experience a load (by virtue of the second L2 cache 109 snooping into the first L2 cache 108) that is disproportional to the load of the processors in cluster 1. As a consequence, in the embodiments where the first L2 cache memory 108 and second L2 cache memory 109 share the same clock signals as the processors in cluster 1 and cluster 2, respectively, a floor frequency may be established for each cluster to enable the first L2 cache memory 108 to respond (with a minimum-desired performance level) to the snoops coming from the second L2 cache memory 109 and vice versa.

Figure 4:
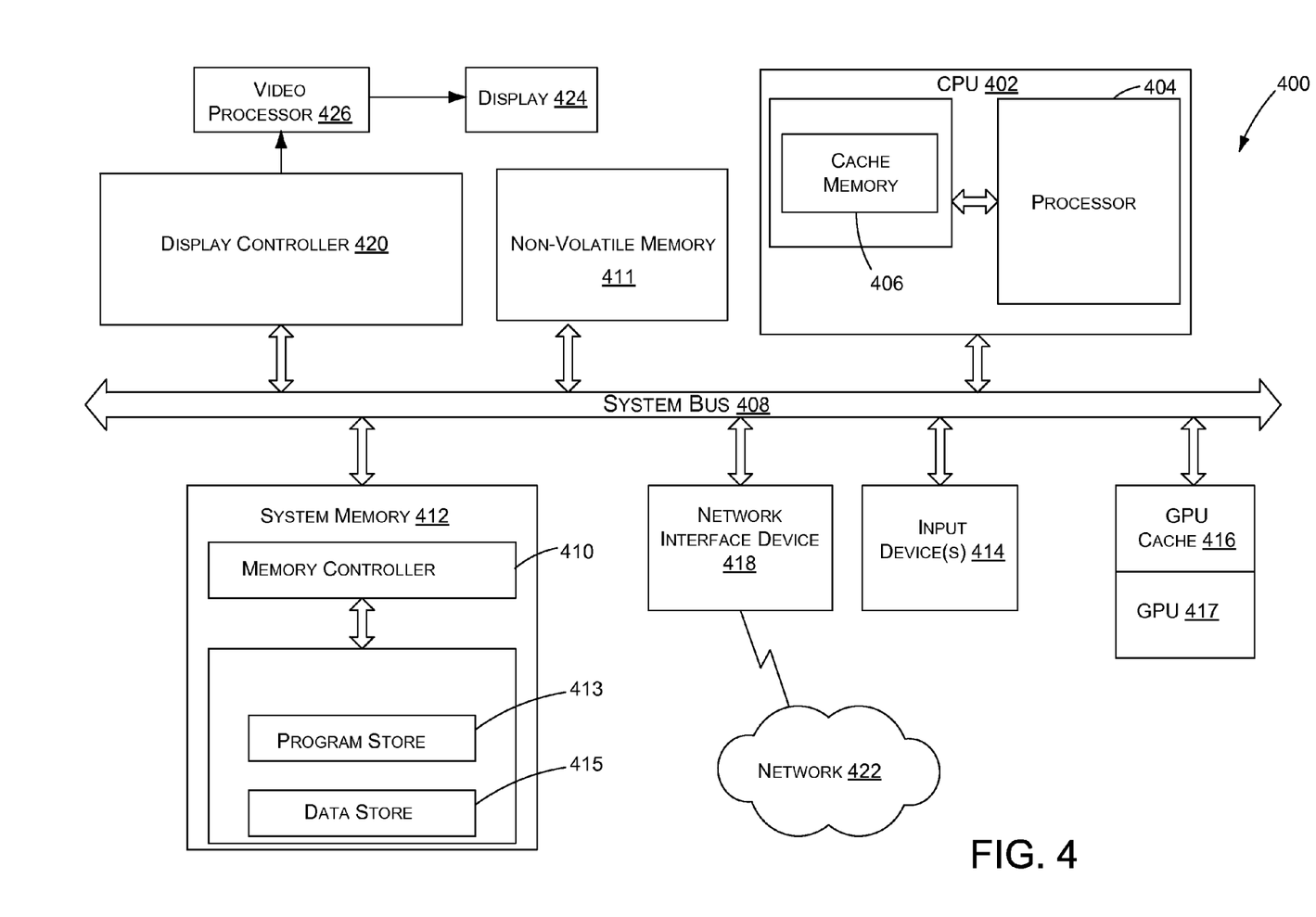
FIG. 4 is a block diagram depicting physical components that may be utilized to realize the computing device depicted in FIG. 1.

Referring next to FIG. 4, shown is an example of a processor-based system 400 that can employ CMI frequency scaling according to the embodiments disclosed herein. In this example, the processor-based system 400 includes one or more central processing units (CPUs) 402, each including one or more processors 404. The CPU(s) 402 may have cache memory 406 coupled to the processor(s) 404 for rapid access to temporarily stored data. The CPU(s) 402 is coupled to a system bus 408 and can inter-couple master devices and slave devices included in the processor-based system 400. As is well known, the CPU(s) 402 communicates with these other devices by exchanging address, control, and data information over the system bus 408. For example, the CPU(s) 402 can communicate bus transaction requests to the memory controller 410 as an example of a slave device. Although not illustrated in FIG. 3, multiple system buses 408 could be provided, wherein each system bus 408 constitutes a different fabric.

Other devices can be connected to the system bus 408. As illustrated in FIG. 4, these devices can include a system memory 412 (which can include program store 413 and/or data store 415), one or more input devices 414, a GPU cache 416, a GPU 417, one or more network interface devices 418, and one or more display controllers 420, as examples. The input device(s) 414 can include any type of input device, including but not limited to input keys, switches, voice processors, etc. The network interface device(s) 418 can be any devices configured to allow exchange of data to and from a network 422. The network 422 can be any type of network, including but not limited to a wired or wireless network, private or public network, a local area network (LAN), a wide local area network (WLAN), and the Internet. The network interface device(s) 418 can be configured to support any type of communication protocol desired.

Also shown is nonvolatile memory 411 that generally functions to store (e.g., persistently store) data and non-transitory processor executable code including code that is associated with the functional components depicted in FIG. 1. In some embodiments for example, the nonvolatile memory 411 includes bootloader code, modem software, operating system code, file system code, and non-transitory processor-executable code to facilitate the implementation of one or more portions of the CMI load monitor 118 and the CMI frequency controller 116 in addition to other components well known to those of ordinary skill in the art that are not depicted nor described in connection with FIG. 1 for simplicity.

In many implementations, the nonvolatile memory 411 is realized by flash memory (e.g., NAND or ONENAND™ memory), but it is certainly contemplated that other memory types may be utilized. Although it may be possible to execute the processor executable code from the nonvolatile memory 411, the executable code in the nonvolatile memory 411 is typically loaded into system memory (e.g., RAM) and executed by one or more processors (e.g., processor 404).

The CPU 402 may also be configured to access the display controller(s) 420 over the system bus 408 to control information sent to one or more displays 424. The display controller(s) 420 sends information to the display(s) 424 to be displayed via one or more video processors 426, which process the information to be displayed into a format suitable for the display(s) 424. The display(s) 424 can include any type of display, including but not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for reducing power consumption on a computing device by controlling a frequency of a cache memory of the computing device, the method comprising:
    classifying request types into one or more request groups, wherein each of the request types is a type of request available to the cache memory of the computing device;
    assigning a number of clock cycles to each request group that is sufficient to process a request in each request group with the cache memory;
    configuring at least one performance counter of the computing device to generate an interrupt when a threshold number of requests to the cache memory occurs;
    monitoring requests that are made to the cache memory with the at least one performance counter;
    determining, in response to the interrupt, a number of requests that occur during a length of time in each request group; and
    prompting a clock controller of the computing device to send an electrical signal to the cache memory to periodically adjust a frequency of the cache memory based upon the number of requests occurring per second in each request group and the assigned number of clock cycles per request group.

2. The method of claim 1, including:
    monitoring the number of clock cycles that are used by the cache memory during the length of time to calculate a scaled-down sample window; and
    calculating the number of requests occurring per second in each request group by dividing the number of requests made to the cache memory in each request group by the scaled down sample window.

3. The method of claim 2, wherein the frequency of the cache memory is adjusted to be a sum of products, wherein each product is the number of requests per second in each group times the number of assigned clock cycles per request in each request group.

4. The method of claim 1, including:
    dynamically tuning a threshold number of requests per counter that trigger an interrupt based upon a history of the number of requests;
    receiving the interrupt from one or more performance counters when the threshold number of requests occur; and
    adjusting the frequency of the cache memory when the interrupt occurs.

5. A non-transitory, tangible processor readable storage medium, encoded with processor readable instructions to perform a method for reducing power consumption on a computing device by controlling a frequency of a cache memory of the computing device, the method comprising:
    classifying request types into one or more request groups, wherein each of the request types is a type of request available to the cache memory of the computing device;
    assigning to each of the request groups a number of clock cycles that is sufficient to process a request in each request group with the cache memory;
    configuring at least one performance counter of the computing device to generate an interrupt when a threshold number of requests to the cache memory occurs;
    monitoring requests that are made to the cache memory with the at least one performance counter;
    determining, in response to the interrupt, a number of requests that occur during a length of time in each request group; and
    prompting a clock controller of the computing device to send an electrical signal to the cache memory to periodically adjust a frequency of the cache memory based upon the number of requests occurring per second in each request group and the assigned number of clock cycles per request group.

6. The non-transitory, tangible processor readable storage medium of claim 5, the method including:
    monitoring the number of clock cycles that are used by the cache memory during the length of time to calculate a scaled-down sample window; and
    calculating the number of requests occurring per second in each request group by dividing the number of requests made to the cache memory in each request group by the scaled down sample window.

7. The non-transitory, tangible processor readable storage medium of claim 6, wherein the frequency of the cache memory is adjusted to be a sum of products, wherein each product is the number of requests per second in each group times the number of assigned clock cycles per request in each request group.

8. The non-transitory, tangible processor readable storage medium of claim 5, the method including:
    dynamically tuning a threshold number of requests per counter that trigger an interrupt based upon a history of the number of requests;
    receiving the interrupt from one or more performance counters when the threshold number of requests occur; and
    adjusting the frequency of the cache memory when the interrupt occurs.

9. A computing device comprising:
a hardware device;
a cache memory coupled to the hardware device;
at least one performance counter coupled to the cache memory;
a clock controller configured to control a frequency of the cache memory;
a cache memory frequency controller coupled to the clock controller and configured to prompt the clock controller to send an electrical signal to the cache memory to control the frequency of the cache memory;
a cache memory load monitor configured to:
 classify request types into one or more request groups, wherein each of the request types is a type of request available to the hardware device to access the cache memory;
 assign a number of clock cycles to each request group that is sufficient to process a request in each request group with the cache memory;
 configure the at least one performance counter to generate an interrupt when a threshold number of requests to the cache memory occurs;
 monitor requests that are made to the cache memory with the at least one performance counter;
 determine, in response to the interrupt, a number of requests that occur during a length of time in each request group; and
 prompt the clock controller of the computing device to send an electrical signal to the cache memory to periodically adjust the frequency of the cache memory based upon the number of requests occurring per second in each request group and the assigned number of clock cycles per request group.

10. The computing device of claim 9, wherein the cache memory load monitor is configured to: monitor the number of clock cycles that are used by the cache memory during the length of time to calculate a scaled-down sample window; and calculate the number of requests occurring per second in each request group by dividing the number of requests made to the cache memory in each request group by the scaled down sample window.

11. The computing device of claim 10, wherein the cache memory load monitor is configured to adjust the frequency of the cache memory to be a sum of products, wherein each product is the number of requests per second in each group times the number of assigned clock cycles per request in each request group.

12. The computing device of claim 9, wherein the cache memory load monitor is configured to:
 dynamically tune a threshold number of requests per counter that trigger an interrupt based upon a history of the number of requests;
 receive the interrupt from one or more performance counters when the threshold number of requests occur; and
 adjust the frequency of the cache memory when the interrupt occurs.

* * * * *